Oct. 24, 1967  S. ERICSSON ETAL  3,348,512
METHOD OF PRODUCING CONICAL VESSELS
Filed Dec. 7, 1964
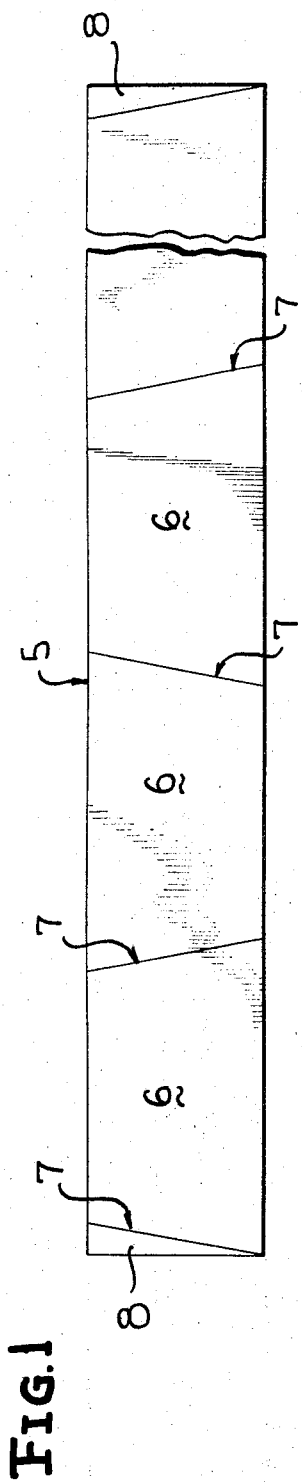
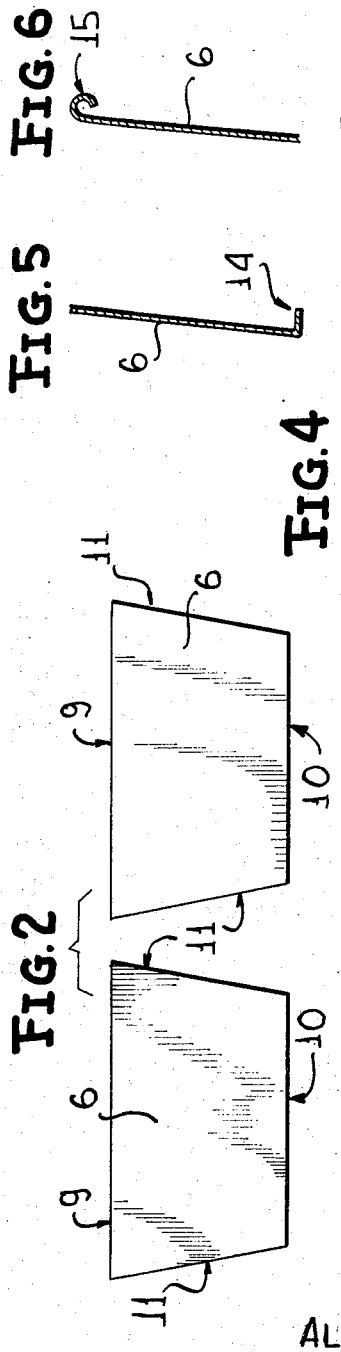
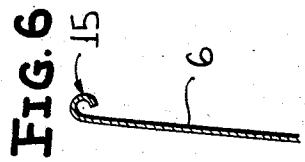
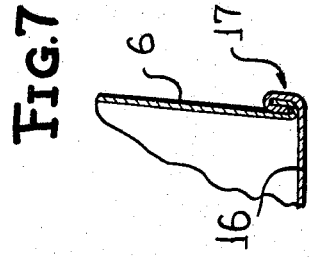
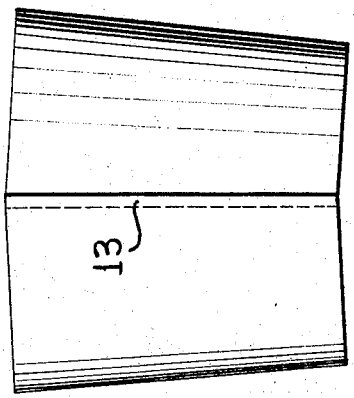
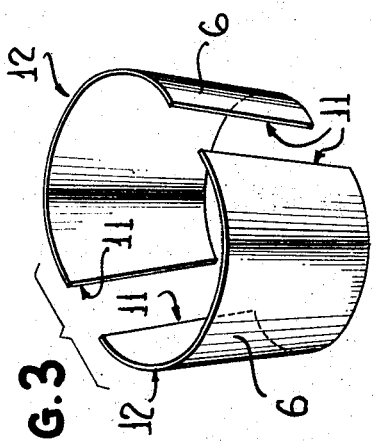
INVENTORS
SVEN ERICSSON &
ALLAN O. E. LENANDER
BY Mason, Porter, Miller & Stewart
ATTORNEYS

United States Patent Office

3,348,512
Patented Oct. 24, 1967

3,348,512
METHOD OF PRODUCING CONICAL VESSELS
Sven Ericsson, Bjarred, and Allan Ove Egard Lenander, Malmo, Sweden, assignors to AB Platmanufaktur, Malmo, Sweden
Filed Dec. 7, 1964, Ser. No. 416,434
7 Claims. (Cl. 113—120)

ABSTRACT OF THE DISCLOSURE

A method of making conical vessel of two body plates of trapezoidal shape, the plates being given half body shape and brought together with the non-parallel sides of the trapezoids lapped and bonded to form the body, a bottom plate applied and seamed onto the body and the top edge being curled, individual plates being first formed by cutting from a parallel edged strip by alternated angle cutting across the strip.

---

The present invention relates to a method of producing conical vessels very economically. A reason why vessels are made conical is that consignments to be shipped to consumers will be less bulky, since the vessels can be stacked, or nested, one in another. Consequently, less space is required for transportation and storage.

It is known to produce conical vessels with the aid of two body plates, each plate having two opposite straight sides and two opposite sides which are arc-formed. Two such bodies are bent so that a cross-section will have the form of a semi-circle. Two bodies thus bent are joined to each other by their two straight side opposite edges being made to overlap each other, these overlapping sections or edges preferably being welded to each other. Moreover, each overlapping part is such that the overlapping at the top and the bottom of the body is of the same size. A body made in this way is seamed to a bottom at its lower end. At its upper end the edge is curled.

It is known that the manufacture of vessels according to the abovementioned method is more than necessarily expensive, owing to the fact that a more expensive tool must be used because of the arced sides of each body plate. Furthermore, it is known that there is an undesirable waste of material in the cutting away of metal in the formation of the arcuate edges.

The purpose of the present invention is to provide a novel method for the production of conical vessels in the practicing of which a cheaper tool can be used and in which the waste of material is negligible and the abovementioned waste of material can be eliminated. This is achieved according to the present invention in that body plates or blanks are used which have the form of a trapezoid, in which the non-parallel sides of each such blank are of equal length. With such form of a body, it is possible to obtain the body blanks from a band or strip which has the same width as the height of the trapezoid comprising each plate or blank. If the bodies which are to be produced are drawn or scribed on such a band, it will be found that there will only be two pieces of waste material, viz. a small triangular section in each extreme end of the band regardless of the length of the band or the number of body blanks drawn or scribed thereon. This may be regarded as the maximum utilization of the material used.

From two body plates formed according to the present invention, i.e. each having the form of a trapezoid, a body for a vessel is made by bending the two body plates so that two "tube halves" are obtained. The opposite converging ends or edges of the two "tube halves" are caused to overlap each other in such a way that each overlapping at the top and at the bottom of the body will be of the same size. The overlapping is made permanent by the two ends or converging overlapped edges of the two body blanks being welded or soldered to each other. The lower end of the body is turned so that a flange is obtained. With the aid of the flange, a bottom is seamed on to the body. With consideration of the fact that said flange has a straight edge, the parallel sides of each body plate have been given such a length that the vessel formed has a cone angle of 3–4°. If desired, the upper edge of the vessel can be curled, so that a less sharp edge is obtained.

With the above and other objects in view that will hereinafter appear, the nature of the invention will be more clearly understood by the following description, the appended claims, and the several views illustrated in the accompanying drawings.

In the drawings:

FIGURE 1 is a schematic plan view illustrating a strip or band with body plates or blanks scribed thereon, an intermediate length of the strip being broken away.

FIGURE 2 is a plan view illustrating a complement of two plates or blanks adapted for the formation of a vessel body.

FIGURE 3 is a perspective view illustrating the plate or blank complement of FIGURE 2 after the plates have been bent or shaped into the form in which they will be assembled in the formation of the vessel body.

FIGURE 4 is a side elevation illustrating the blank complement of FIGURE 3 in assembled, seam bonded condition.

FIGURE 5 is a fragmentary sectional view illustrating a bottom portion of a vessel body with its edge flanged preparatory to the assembling of a bottom thereon.

FIGURE 6 is a view similar to FIGURE 5 showing the upper edge extremity of a plate or blank in the final curled condition.

FIGURE 7 is a fragmentary sectional view illustrating a double or roll seam as an exemplary method of joining or attaching a bottom member to the bottom portion of the vessel.

The strip or band from which the body plates or blanks are cut is indicated at 5, the trapezoidal blanks 6 being drawn, or scribe defined thereon, by the traversing lines 7 which are alternately slanted as illustrated in FIGURE 1 to eliminate waste. It will be apparent by reference to FIGURE 1 that this manner of cutting the one or more body complements of plates or blanks from a rectangular strip or band will eliminate all waste with the exception of the very narrow triangular pieces 8 at the extreme ends of the strip or band.

The two blanks of each body complement as shown in FIGURE 2 include parallel top and bottom edges designated 9 and 10 respectively and converging end or side edges 11. It will be apparent that the parallel top and bottom edges 9 and 10 are the straight side edges of the strip or band as shown in FIGURE 1.

The blanks 6 are curved to half body shapes as at 12, as shown in FIGURE 3, and are brought together with their edges 11 overlapped at 13 to provide side seams which are bonded, as by welding or soldering.

It is preferred that the bottom edges shall be flanged as at 14, as shown in FIGURE 5, and that the top edges be curled as at 15 as shown in FIGURE 6. It is to be understood that this edge flanging and curling may be accomplished in any approved manner after the body of the vessel has been assembled as in FIGURE 4, or the flanging and curling can be performed in the flat, if desired.

After the assembling of the vessel body, a bottom 16 of appropriate shape is secured in place, as by seaming at 17. A double seam, or rolled seam is indicated in FIGURE 7, the same involving the vessel body flange 14, but it is to be understood that any other acceptable means of attaching the bottom to the vessel body can be employed.

While preferred part structure and method steps have been described herein, it is to be understood that variations in said structures and steps may be provided without departing from the spirit and scope of the invention as defined in the appended claims.

We claim:

1. A method of producing conical vessels using two body plates and a bottom plate, characterized in that only two body plates are used, each having the form of a trapezoid, of which the two non-parallel sides are of equal length, in that the two plates are bent in such a way and placed in such a way that a conical body is formed, in that adjacent plates are made to overlap each other in such a way that the overlapping is of the same size at both ends of the body, in that the two overlapping end sections are firmly secured to each other, and in that the bottom plate is thereafter secured on the body.

2. A method according to claim 1, characterized in that the bottom plate is seamed on to the body.

3. A method according to claim 1, characterized in that the securing of the overlapping plate end sections are secured by bonding.

4. A method according to claim 1, characterized in that the edge of the end of the body which is to comprise the opening of the vessel is curled.

5. A method according to claim 1, characterized in that the bottom plate is seamed on to the body, and in that the edge of the end of the body which is to comprise the opening of the vessel is curled.

6. A method according to claim 1 characterized in that the length of the parallel sides of each of the trapezoidal body plates is chosen in such a way that the vessel will have a cone angle of approximately 3–4°.

7. A method according to claim 1 further characterized in that the body plates of each body are cut from a continuous strip defined in part by two longitudinal parallel edges which are to comprise top and bottom edges in the vessel body, the cutting of the body plates from the strip being by alternated angle cutting across the strip on lines defining the non-parallel sides of each trapezoidal body plate.

References Cited
UNITED STATES PATENTS

| | | | |
|---|---|---|---|
| 2,734,261 | 2/1956 | Stuck | 29—463 |
| 2,948,061 | 8/1960 | Carstens | 29—463 |
| 3,238,610 | 3/1966 | Berg | 113—120 |

RICHARD J. HERBST, *Primary Examiner.*

R. D. GREFE, *Assistant Examiner.*